(12) United States Patent
Mitsutani

(10) Patent No.: US 12,151,385 B2
(45) Date of Patent: Nov. 26, 2024

(54) MEASUREMENT SYSTEM, MEASUREMENT METHOD AND NON-TRANSITORY STORAGE MEDIUM

(71) Applicant: MITUTOYO CORPORATION, Kanagawa (JP)

(72) Inventor: Naoki Mitsutani, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 253 days.

(21) Appl. No.: 17/893,791

(22) Filed: Aug. 23, 2022

(65) Prior Publication Data
US 2023/0062780 A1     Mar. 2, 2023

(30) Foreign Application Priority Data

Sep. 2, 2021    (JP) ................................. 2021-143284

(51) Int. Cl.
*B25J 9/16*      (2006.01)
*B25J 19/02*     (2006.01)
*G06T 7/60*      (2017.01)
*G06T 7/73*      (2017.01)

(52) U.S. Cl.
CPC ........... *B25J 9/1697* (2013.01); *B25J 19/023* (2013.01); *G06T 7/60* (2013.01); *G06T 7/73* (2017.01); *G06T 2207/30164* (2013.01)

(58) Field of Classification Search
CPC ...... B25J 9/1697; B25J 19/023; B25J 9/1679; B25J 11/00; G06T 7/60; G06T 7/73; G06T 2207/30164; G06T 2207/10016; G05B 2219/37575; G05B 2219/39045
See application file for complete search history.

(56) References Cited

U.S. PATENT DOCUMENTS

| | | | |
|---|---|---|---|
| 2018/0095549 A1* | 4/2018 | Watanabe | G06F 3/0346 |
| 2019/0176221 A1 | 6/2019 | Serino et al. | |
| 2022/0155065 A1 | 5/2022 | Hidaka et al. | |
| 2022/0398707 A1* | 12/2022 | Choi | B25J 9/1679 |
| 2023/0281857 A1* | 9/2023 | Suzuki | B25J 9/1697 348/46 |
| 2024/0046401 A1* | 2/2024 | Miyakawa | B25J 15/08 |

FOREIGN PATENT DOCUMENTS

JP        6659324 B2     3/2020

* cited by examiner

*Primary Examiner* — Harry Y Oh
*Assistant Examiner* — Dylan M Katz
(74) *Attorney, Agent, or Firm* — Greenblum & Bernstein, P.L.C.

(57) ABSTRACT

A measurement system includes a multi-axis robot, a measurement unit coupled to the multi-axis robot, and a data processing apparatus, wherein the measurement unit includes one or more imaging devices movable with respect to a reference position of the multi-axis robot, and a position specification device for specifying a position of one or more of the imaging devices with respect to the reference position, wherein the data processing apparatus includes an acquisition part for acquiring a plurality of pieces of captured image data generated by having one or more of the imaging devices capture images at two or more positions, and a measurement part for measuring a distance between the plurality of feature points in a workpiece on the basis of a position of the feature point of the workpiece included in the plurality of pieces of captured image data.

11 Claims, 10 Drawing Sheets

MEASUREMENT SYSTEM, MEASUREMENT METHOD AND NON-TRANSITORY STORAGE MEDIUM

CROSS-REFERENCE TO RELATED APPLICATIONS

The present application claims priority to Japanese Patent Applications number 2021-143284, filed on Sep. 2, 2021. The contents of this application are incorporated herein by reference in their entirety.

BACKGROUND OF THE INVENTION

The present disclosure relates to a measurement system, a measurement method, and a non-transitory storage medium.

Conventionally, there has been known a determination apparatus that determines whether or not a subject is abnormal on the basis of a captured image captured by an imaging device mounted on a multi-axis robot (for example, see Japanese Patent No. 6659324).

When measuring a distance between a plurality of feature points on a workpiece, which is a subject, on the basis of a captured image captured with an imaging device mounted on a multi-axis robot, the accuracy of the measurement is affected by the positioning accuracy of the multi-axis robot. There is a problem that the multi-axis robot cannot be used to measure the workpiece if the positioning accuracy of the multi-axis robot is lower than the accuracy required to measure the workpiece.

BRIEF SUMMARY OF THE INVENTION

The present disclosure focuses on this point, and an object of the present disclosure is to improve the accuracy of measuring a workpiece using a multi-axis robot.

A measurement system according to a first aspect of the present disclosure includes a multi-axis robot, a measurement unit coupled to the multi-axis robot, and a data processing apparatus, wherein the measurement unit includes one or more imaging devices movable with respect to a reference position of the multi-axis robot, and a position specification device for specifying a position of one or more of the imaging devices with respect to the reference position, wherein the data processing apparatus includes an acquisition part for acquiring a plurality of pieces of captured image data generated by having one or more of the imaging devices capture images at two or more positions, and a measurement part for measuring a distance between the plurality of feature points in a workpiece on the basis of a position of the feature point of the workpiece included in the plurality of pieces of captured image data.

A measurement method according to a second aspect of the present disclosure is a measurement method, executed by a computer, that includes the steps of acquiring a plurality of pieces of captured image data generated by having one or more imaging devices, supported by a multi-axis robot, capture images at two or more positions, and measuring a distance between a plurality of feature points in a workpiece on the basis of a position of a feature point of the workpiece included in the plurality of pieces of captured image data.

A non-transitory storage medium storing a program according to a third aspect of the present disclosure is a non-transitory storage medium that stores a program for causing a computer to execute the steps of acquiring a plurality of pieces of captured image data generated by having one or more imaging devices), supported by a multi-axis robot, capture images at two or more positions, and measuring a distance between a plurality of feature points in a workpiece on the basis of a position of a feature point of the workpiece included in the plurality of pieces of captured image data.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Overview of Measurement System 1]

Figure 1:
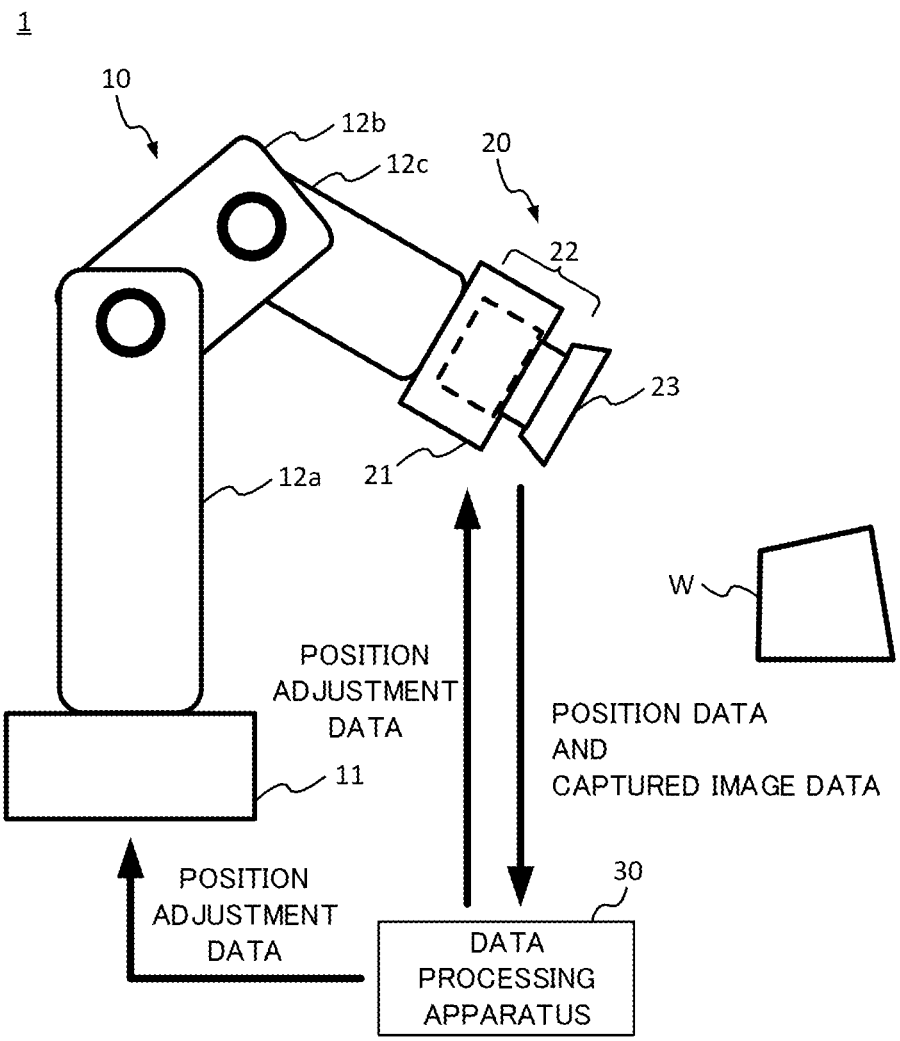
FIG. 1 illustrates an overview of a measurement system 1.

FIG. 1 illustrates an overview of a measurement system 1. The measurement system I includes a multi-axis robot 10, a measurement unit 20, and a data processing apparatus 30. The multi-axis robot 10 and the measurement unit 20 are connected to the data processing apparatus 30 via a network such as an intranet or the Internet, or a connection line such as a Universal Serial Bus (USB). The measurement system 1 is a system for measuring a distance between a plurality of feature points in a workpiece W. The feature point is an end portion, a position having irregularities, or a position in the workpiece W where the color is different from other positions, for example.

The multi-axis robot 10 includes a base 11 and a plurality of arms 12 (arms 12a, 12b, and 12c), and the arm 12a is fixed to the base 11. The arm 12 has a plurality of joints, and the measurement unit 20 is connected to the tip of the arm 12c. The multi-axis robot 10 moves the arm 12 on the basis of position adjustment data inputted from the data processing apparatus 30.

The measurement unit 20 includes a body 21, a position specification device 22, and one or more imaging devices 23, and the body 21 is connected to the tip of the arm 12c. The position specification device 22 is a linear encoder, for example, and specifies the position of the one or more imaging devices 23 with respect to the reference position of the multi-axis robot 10. The reference position of the multi-axis robot 10 is a position where the linear encoder is fixed by the arm 12c or an origin position of the linear encoder, for example. In the present embodiment, the position where the linear encoder is fixed by the arm 12c is set as the reference position of the multi-axis robot 10.

Figure 2A:
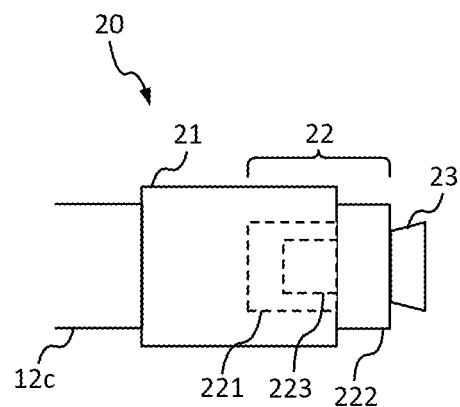
FIGS. 2A and 2B illustrate a configuration of a measurement unit 20.
Figure 2B:
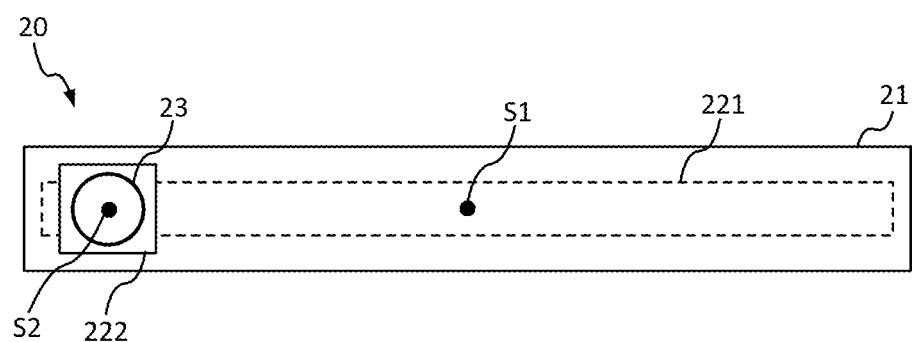

FIGS. 2A and 2B illustrate a configuration of the measurement unit 20. FIG. 2A is a side view of the measurement unit 20. FIG. 2B is a front view of the measurement unit 20. As shown in FIG. 2A, the position specification device 22 includes a scale 221, a head part 222, and a head driving part 223. The scale 221 and the head driving part 223 are accommodated in the body 21.

The scale 221 includes gradations showing the position of the imaging device 23, and shows the position of the imaging device 23 with respect to the reference position of the multi-axis robot 10. A position S1 shown in FIG. 2B is a position where the measurement unit 20 is fixed by the arm 12c, and is the reference position of the multi-axis robot 10. In FIG. 2B, the scale 221 outputs information indicating i) a distance between the position S1 and a position S2 that is the center position of the imaging device 23 and ii) whether the position S2 is to the left or right of the position S1, for example.

The head part 222 is a coupling member for coupling the position specification device 22 and the imaging device 23, and moves along the scale 221. If the measurement unit 20 includes one or more imaging devices 23, the measurement unit 20 includes one or more head parts 222 corresponding to the imaging devices 23. In this case, the one or more imaging devices 23 move along the scale 221 while being coupled to the one or more head parts 222.

The head driving part 223 moves the head part 222 along the scale 221 on the basis of the position adjustment data inputted from the data processing apparatus 30, for example. As an example, the head driving part 223 includes i) a light emitting element (for example, a light emitting diode) that radiates light to the scale 221 and ii) a light receiving element that receives the light emitted from the light emitting element and reflected by the scale 221. The head driving part 223 outputs data, indicating changes in the amount of received light caused by the head driving part 223 moving along the scale 221, to the data processing apparatus 30 as position data indicating the position of the imaging device 23.

Referring back to FIG. 1, the imaging device 23 is a camera, for example, and outputs captured image data, generated by capturing an image of the workpiece W, to the data processing apparatus 30. The imaging device 23 is movable with respect to the reference position of the multi-axis robot 10, and can be moved in the longitudinal direction of the body 21, for example.

The data processing apparatus 30 is a computer that executes a program to measure the distance between the plurality of feature points in the workpiece W, for example. The data processing apparatus 30 outputs the position adjustment data to the position specification device 22 to move the imaging device 23 such that the imaging device 23 is in a position where the feature points of the workpiece W can be imaged. The data processing apparatus 30 acquires position data indicating the position of the imaging device 23 from the position specification device 22.

The data processing apparatus 30 acquires the captured image data generated by having the imaging device 23 capture images at two or more positions. The data processing apparatus 30 measures the distance between the plurality of feature points on the workpiece W, on the basis of the positions of the feature points of the workpiece W included in the captured image data.

Figure 3A:
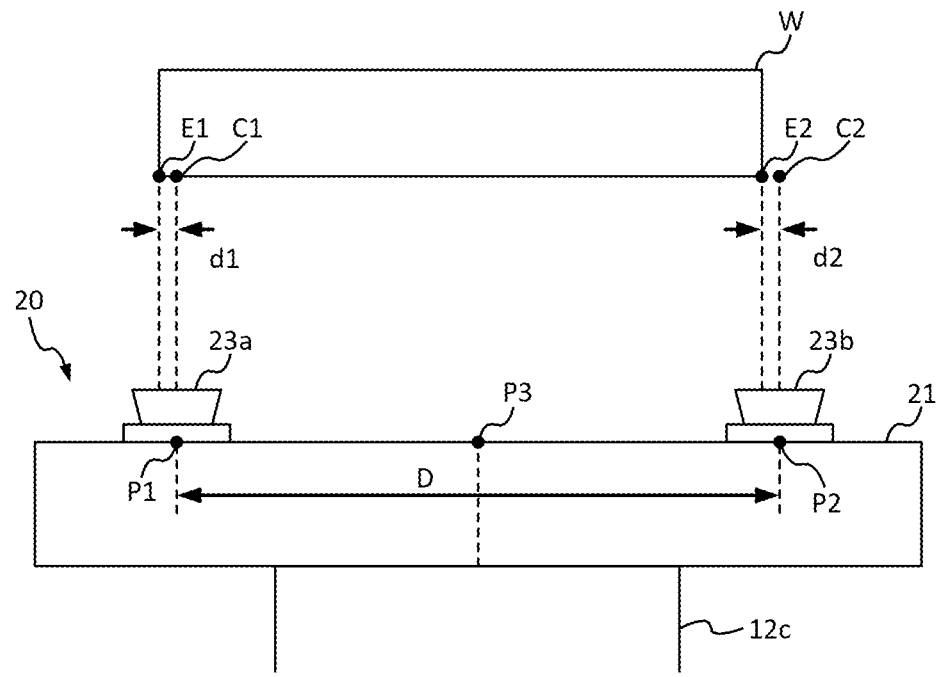
FIGS. 3A, 3B, and 3C illustrate an operation of a data processing apparatus 30 to measure a workpiece W.
Figure 3B:
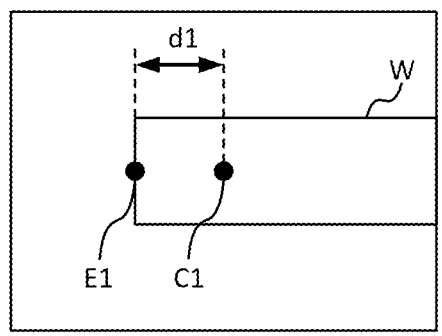
Figure 3C:
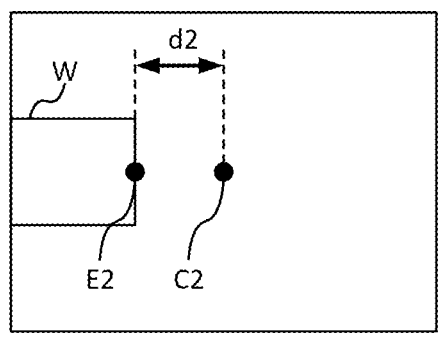

FIGS. 3A, 3B, and 3C illustrate an operation of the data processing apparatus 30 to measure the workpiece W. FIG. 3A is a top view of the measurement unit 20 and the workpiece W. FIG. 3B shows the captured image obtained by capturing a feature point E1 of the workpiece W with the imaging device 23a at the position P1. FIG. 3C shows the captured image obtained by capturing a feature point E2 of the workpiece W with the imaging device 23b at the position P2. In FIGS. 3A, 3B, and 3C, as an example, the data processing apparatus 30 measures the distance between the feature point E1 of the workpiece W and the feature point E2 of the workpiece W.

The following is an overview of the operation of the data processing apparatus 30 measuring the distance between the feature point E1 and the feature point E2, with reference to FIGS. 3A, 3B, and 3C. The data processing apparatus 30 measures a distance D between the imaging device 23a and the imaging device 23b. The data processing apparatus 30 measures the distance D on the basis of i) the position data indicating a position of the position P1 with respect to a reference position P3, acquired from the position specification device 22 and ii) the position data indicating a position of the position P2 with respect to the reference position P3, acquired from the position specification device 22.

Subsequently, the data processing apparatus 30 acquires i) the captured image data (captured image data corresponding to the captured image shown in FIG. 3B) generated by capturing the feature point E1 with the imaging device 23a at the position P1 and ii) the captured image data (captured image data corresponding to the captured image shown in FIG. 3C) generated by capturing the feature point E2 with the imaging device 23b at the position P2.

The data processing apparatus 30 measures a distance d1 between a reference position C1 and the feature point E1 included in the captured image shown in FIG. 3B, and a distance d2 between a reference position C2 and the feature point E2 included in the captured image shown in FIG. 3C. The reference position C1 included in the captured image is a position corresponding to the position P1, and is the center position of the image shown in FIG. 3B, for example. The reference position C2 included in the captured image is a position corresponding to the position P2, and is the center position of the image shown in FIG. 3C, for example.

The data processing apparatus 30 i) measures the distance d1 on the basis of the number of pixels and the size of the pixels between the reference position C1 and the feature point E1 in the captured image shown in FIG. 3B, and ii) measures the distance d2 on the basis of the number of pixels and the size of the pixels between the reference position C2 and the feature point E2 in the captured image shown in FIG. 3C. For example, if the number of pixels corresponding to the distance d1 is 10 pixels, and each pixel is 3 microns on a side, the data processing apparatus 30 specifies that a measurement result of the distance d1 is 30 microns.

The data processing apparatus 30 measures the distance between the feature point E1 and the feature point E2 on the basis of the measured distance D, distance d1, and distance d2. In FIGS. 3A, 3B, and 3C, the data processing apparatus 30 measures the distance between the feature point E1 and the feature point E2 by calculating "distance D+distance d1−distance d2." By having the measurement system 1 operate in this manner, the measurement system 1 can measure the workpiece W with accuracy corresponding to i) the accuracy of the position specification device 22 and ii) the size of the pixels of the captured image captured by the imaging device 23. Therefore, by having the measurement system I include the position specification device 22 with sufficient accuracy and the high-resolution imaging device 23, the measurement system 1 can measure the distance between the feature points in the workpiece W with an accuracy higher than the accuracy of the position of the multi-axis robot 10.

It should be noted that FIGS. 3A, 3B, and 3C show the imaging device 23a and the imaging device 23b, but the imaging device 23a may function as the imaging device 23b. If the imaging device 23a functions as the imaging device 23b, the data processing apparatus 30 outputs, to the position specification device 22, position adjustment data for moving the imaging device 23a from the position P1 to the position P2 after the imaging device 23a at the position P1 captures the feature point E1, for example.

[Configuration of Data Processing Apparatus 30]

Figure 4:
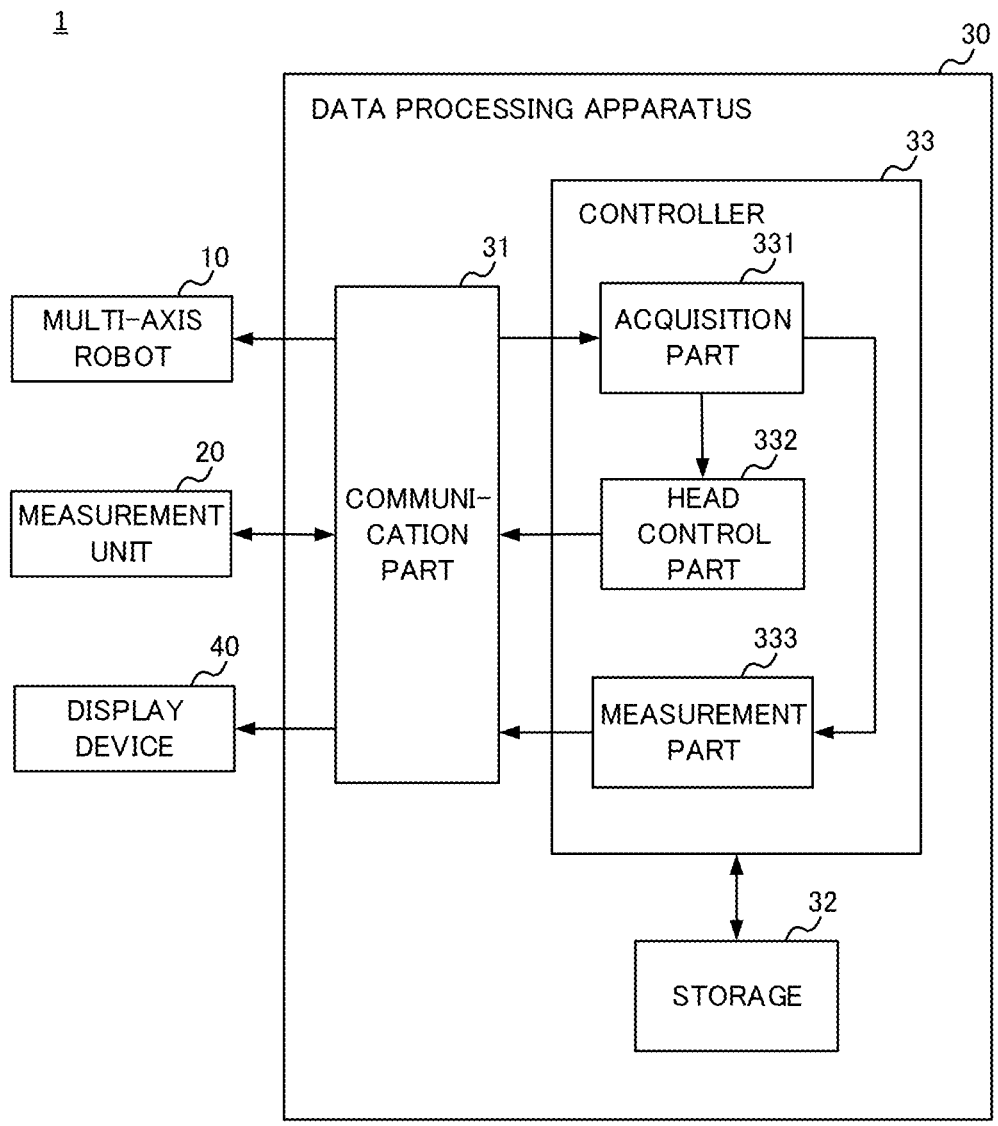
FIG. 4 shows a configuration of the data processing apparatus 30.

FIG. 4 shows a configuration of the data processing apparatus 30. The data processing apparatus 30 includes a communication part 31, a storage 32, and a controller 33. The controller 33 includes an acquisition part 331, a head control part 332, and a measurement part 333. FIG. 4 also shows a display device 40 that displays the measurement result of the data processing apparatus 30 measuring the distance of the workpiece W.

The communication part 31 includes a communication device for transmitting and receiving information via a network. The communication device is a Local Area Network (LAN) controller, a wireless LAN controller, or a USB controller, for example. The storage 32 includes storage media such as a Read Only Memory (ROM), Random Access Memory (RAM), and Solid State Drive (SSD). The storage 32 stores a program executed by the controller 33.

The controller 33 is a Central Processing Unit (CPU), for example. The controller 33 functions as the acquisition part 331, the head control part 332, and the measurement part 333 by executing the program stored in the storage 32.

The acquisition part 331 acquires a plurality of pieces of captured image data generated by having the one or more imaging devices 23 capture images at two or more positions. The acquisition part 331 acquires the plurality of pieces of captured image data generated by having the imaging device 23 capture images at the position of the imaging device 23a and the position of the imaging device 23b shown in FIG. 3A, for example. If the measurement unit 20 includes a plurality of imaging devices 23, the acquisition part 331 acquires the plurality of pieces of captured image data generated by having each of the plurality of imaging devices 23 capture images at one or more positions.

The acquisition part 331 acquires the position data indicating the position of the imaging device 23 with respect to the reference position of the multi-axis robot 10 specified by the position specification device 22. If the measurement unit 20 includes the plurality of imaging devices 23, the acquisition part 331 acquires the position data indicating the position of each of the plurality of imaging devices 23 with respect to the reference position of the multi-axis robot 10.

The head control part 332 controls the position of the head part 222 such that the feature point is at a position included in the captured image data. For example, the head control part 332 determines whether or not the feature point is at a position included in the captured image data acquired by the acquisition part 331. If no feature point is at a position included in the captured image data, the head control part 332 outputs the position adjustment data to the head driving part 223 to move the head part 222. If the feature point is at a position included in the captured image data, the head control part 332 does not output the position adjustment data to the head driving part 223.

Specifically, if the captured image shown in FIG. 3B includes the workpiece W and does not include the feature point E1, the head control part 332 moves the position of the head part 222 to move the imaging device 23a toward the left end. On the other hand, if the workpiece W is not included in the captured image shown in FIG. 3B, the head control part 332 moves the position of the head part 222 to move the imaging device 23a toward the right end.

The head control part 332 may output the position adjustment data for moving the arm 12 of the multi-axis robot 10, to the multi-axis robot 10. For example, if the distance between the position included in the area to be imaged by the imaging device 23 and the position of the feature point of the workpiece W exceeds a threshold value, the head control part 332 may cause the arm 12 coupled to the measurement unit 20 to move such that the imaging device 23 can capture the feature point of the workpiece W by outputting the position adjustment data for adjusting the position of the measurement unit 20, to the multi-axis robot 10. The threshold value is the maximum value of the length of the range in which the imaging device 23 can move, for example.

The measurement part 333 measures the distance between the feature points of the workpiece W, on the basis of the positions of the feature points of the workpiece W included in the plurality of pieces of captured image data. The measurement part 333 measures the distance between the plurality of feature points in the workpiece W on the basis of i) the position of the imaging device 23 with respect to the reference position of the multi-axis robot 10 and ii) the position of the feature point with respect to the reference position in the captured image captured by the imaging device 23, for example.

The measurement part 333 measures the distance between the feature point E1 and the feature point E2 on the basis of i) the positions P1 and P2 with respect to the reference position P3 shown in FIG. 3A, ii) the position of the feature point E1 with respect to the reference position C1 shown in FIG. 3B, and iii) the position of the feature point E2 with respect to the reference position C2 shown in FIG. 3C, for example. The measurement part 333 causes the display device 40 to display the measurement result indicating the measured distance.

If the feature points of the workpiece W are at one end and the other end of the workpiece W, the measurement part 333 measures the position of the one end of the workpiece W in the captured image data generated by having the imaging device 23 capture an image at the first position. Then, the measurement part 333 measures the distance between the position of the one end of the workpiece W and the position of the other end of the workpiece W included in the captured image data generated by having the imaging device 23 capture an image at a second position different from the first position. The first position is the position P1 shown in FIG. 3A, and the second position is the position P2 shown in FIG. 3A, for example.

The measurement part 333 measures the distance between the position of the one end (feature point E1) of the workpiece W and the position of the other end (feature point E2) shown in FIG. 3A, for example. In this case, the measurement part 333 measures the distance between the feature point E1 included in the captured image data generated by having the imaging device 23a capture an image at the position P1 and the feature point E2 included in the captured image data generated by having the imaging device 23b capture an image at the position P2.

The measurement part 333 measures the distance between the positions of the imaging devices 23 specified by the position specification device 22 at the first position and the second position, for example. The measurement part 333 measures the distance between the reference position and the feature point in each piece of the captured image data generated by having the imaging devices 23 capture images at the first position and the second position. The measurement part 333 measures the distance between the position of the one end of the workpiece W and the position of the other end of the workpiece W, on the basis of the measured distance.

The measurement part 333 measures i) the distance d1 between the position of the feature point E1 and the reference position C1 and ii) the distance d2 between the position of the feature point E2 and the reference position C2, in the captured images shown in FIGS. 3(b) and 3(c), for example. The reference position C1 and the reference position C2 are the respective center positions of the captured images shown in FIG. 3B and FIG. 3C.

The measurement part 333 measures the distance d1 and the distance d2 by specifying the number of pixels and the size of the pixels corresponding to each of the distance d1 and the distance d2. The measurement part 333 specifies the distance between the feature point E1 and the feature point E2 in the workpiece W, on the basis of i) the measured distance d1 and d2 and ii) the distance D between the imaging device 23a and the imaging device 23b. By having the measurement part 333 operate in this manner, the measurement part 333 can measure the distance between the plurality of feature points with accuracy corresponding to the accuracy of the position specification device 22 and the size of the pixels included in the captured image. As a result, the measurement part 333 can measure the distance with higher accuracy than the positioning accuracy of the multi-axis robot 10.

[Correction on the Basis of Distance to Workpiece W]

Figure 5:
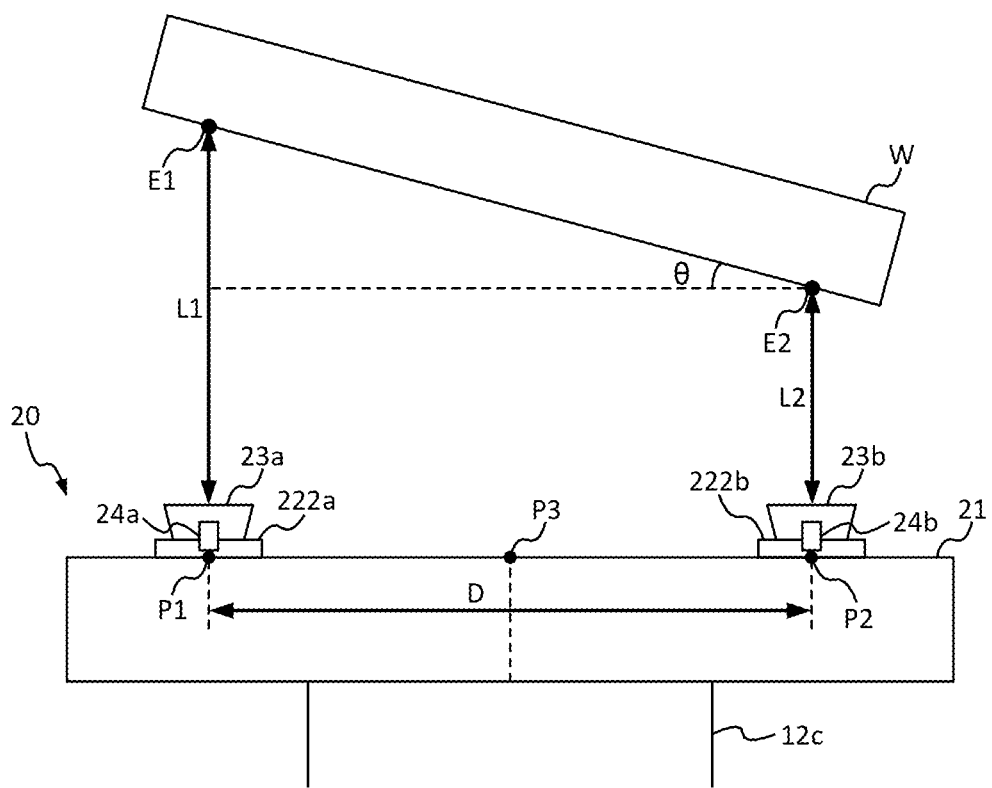
FIG. 5 illustrates an operation of a distance measurement device 24.

The measurement part 333 may correct the length from the one end to the other end of the workpiece W on the basis of the distance from the imaging device 23 to the feature point measured by the measurement unit 20. In this case, the measurement unit 20 further includes a distance measurement device 24 for measuring the distance from the imaging device 23 to the feature point, for example. FIG. 5 illustrates an operation of the distance measurement device 24. FIG. 5 is a top view of the measurement unit 20 and the workpiece W. In FIG. 5, a distance measurement device 24a and a distance measurement device 24b are respectively coupled to a head part 222a and a head part 222b.

The distance measurement device 24a measures a distance L1 that is a distance between the imaging device 23a and the feature point E1. The distance measurement device 24b measures a distance L2 that is a distance between the imaging device 23b and the feature point E2. The measurement unit 20 outputs the distance L1 and the distance L2 measured by the distance measurement device 24a and the distance measurement device 24b, to the data processing apparatus 30.

Referring back to FIG. 4, the measurement part 333 corrects the distance between the position of the one end of the workpiece W and the position of the other end of the workpiece W, on the basis of the relationship between i) the first distance that is from the imaging device 23 to the feature point measured by the distance measurement device 24 at the first position and ii) the second distance that is from the imaging device 23 to the feature point measured by the distance measurement device 24 at the second position. The measurement part 333 measures the length from the one end to the other end of the workpiece W on the basis of the corrected distance.

For example, in FIG. 5, the measurement part 333 acquires the distance L1 that is the first distance from the imaging device 23a to the feature point E1 measured by the distance measurement device 24a at the position P1 that is the first position. The measurement part 333 acquires the distance L2 that is the second distance from the imaging device 23b to the feature point E2 measured by the distance measurement device 24b at the position P2 that is the second position. The measurement part 333 measures the distance from the one end to the other end of the workpiece W by correcting the distance between the position of the one end of the workpiece W and the position of the other end of the workpiece W, on the basis of i) the difference between the distance L1 acquired from the first distance measurement device 24 (distance measurement device 24a) and the distance L2 acquired from the second distance measurement device 24 (distance measurement device 24b) and ii) an angle θ that is the inclination of the workpiece W with respect to the longitudinal direction of the measurement unit 20 calculated on the basis of the distance D between the first position (position P1) and the second position (position P2).

By having the measurement part 333 operate in this manner, the measurement part 333 can measure the distance from the one end to the other end of the workpiece W with high accuracy by correcting the distance between the plurality of measured feature points on the basis of the angle θ, even if the workpiece W is not parallel to the longitudinal direction of the measurement unit 20.

It should be noted that the data processing apparatus 30 may measure the distance from the one end to the other end of the workpiece W after moving the arm 12 such that the lengths of the distance L1 and the distance L2 are equal to each other. In the data processing apparatus 30, the position at which the arm 12 is to be moved may be specified on the basis of the angle θ calculated by the measurement part 333, and the position adjustment data for moving the arm 12 may be outputted from the head control part 332 to the multi-axis robot 10, for example. Specifically, the data processing apparatus 30 may move the arm 12 such that the angle θ calculated by the measurement part 333 approaches zero.

[Processing Sequence in Measurement System 1]

Figure 6:
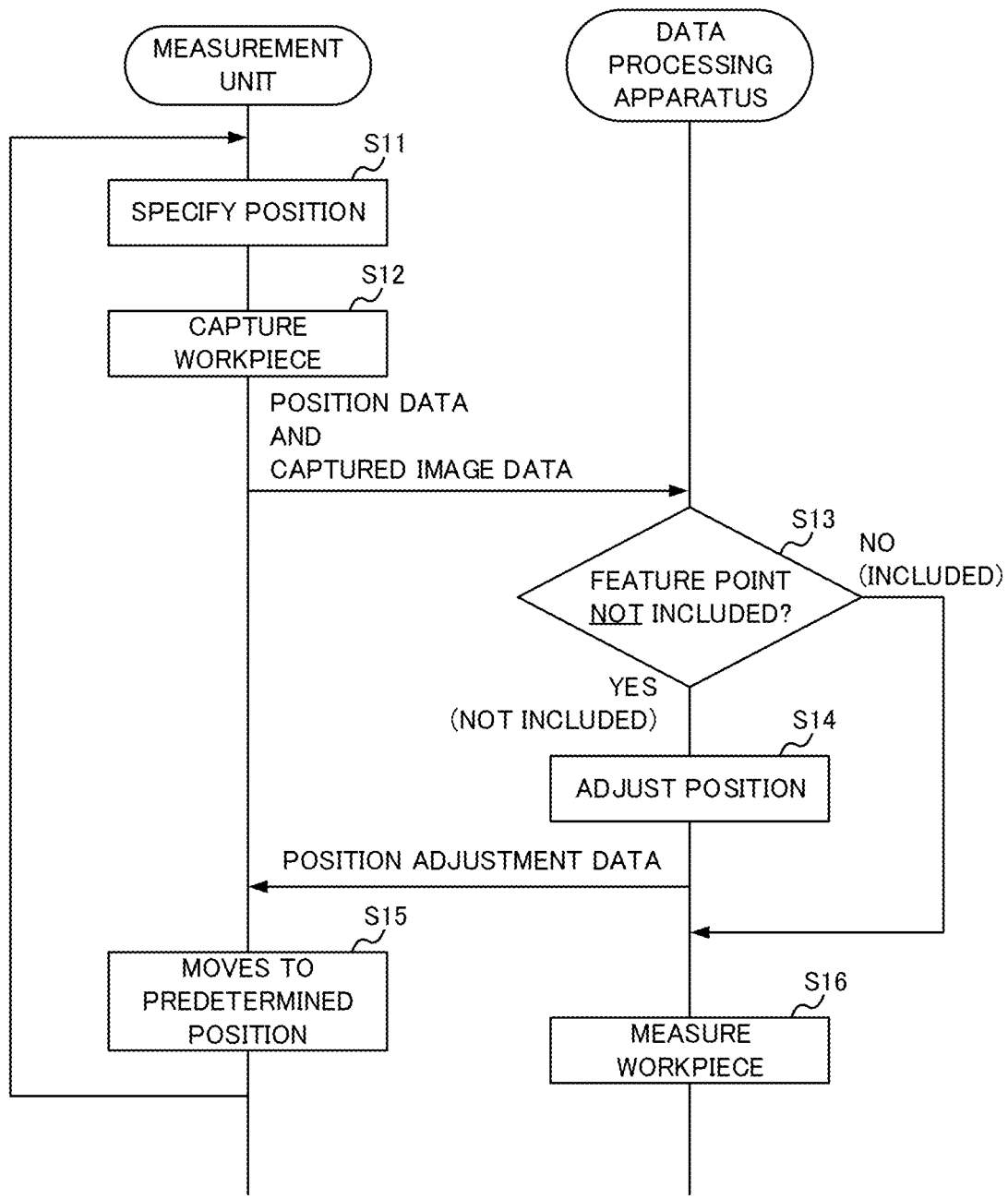
FIG. 6 shows an example of a processing sequence in the measurement system 1.

FIG. 6 shows an example of a processing sequence in the measurement system 1. FIG. 6 shows a portion of data transmitted and received between the measurement unit 20 and the data processing apparatus 30. The processing sequence shown in FIG. 6 starts when the position specification device 22 specifies the position of the imaging device 23 with respect to the reference position of the multi-axis robot 10 (step S11).

The imaging device 23 captures an image of the workpiece W (step S12). The measurement unit 20 outputs the position data indicating the position of the imaging device 23 specified by the position specification device 22 and the captured image data generated by having the imaging device 23 capture an image, to the data processing apparatus 30. The data processing apparatus 30 determines whether or not the acquired captured image data includes the feature point (step S13).

If the feature point is not included in the captured image data (YES in step S13), the data processing apparatus 30 adjusts the position of the imaging device 23 (step S14). The data processing apparatus 30 outputs the position adjustment data for moving the imaging device 23, to the measurement unit 20.

In response to the acquisition of the position adjustment data, the measurement unit 20 moves the imaging device 23 to a predetermined position by having the head driving part 223 move the head part 222 (step S15). Thereafter, the measurement unit 20 returns to step S11. If the feature point is included in the captured image data (NO in step S13), the data processing apparatus 30 measures the distance between the plurality of feature points in the workpiece W (step S16).

[Operation in Data Processing Apparatus 30]

Figure 7:
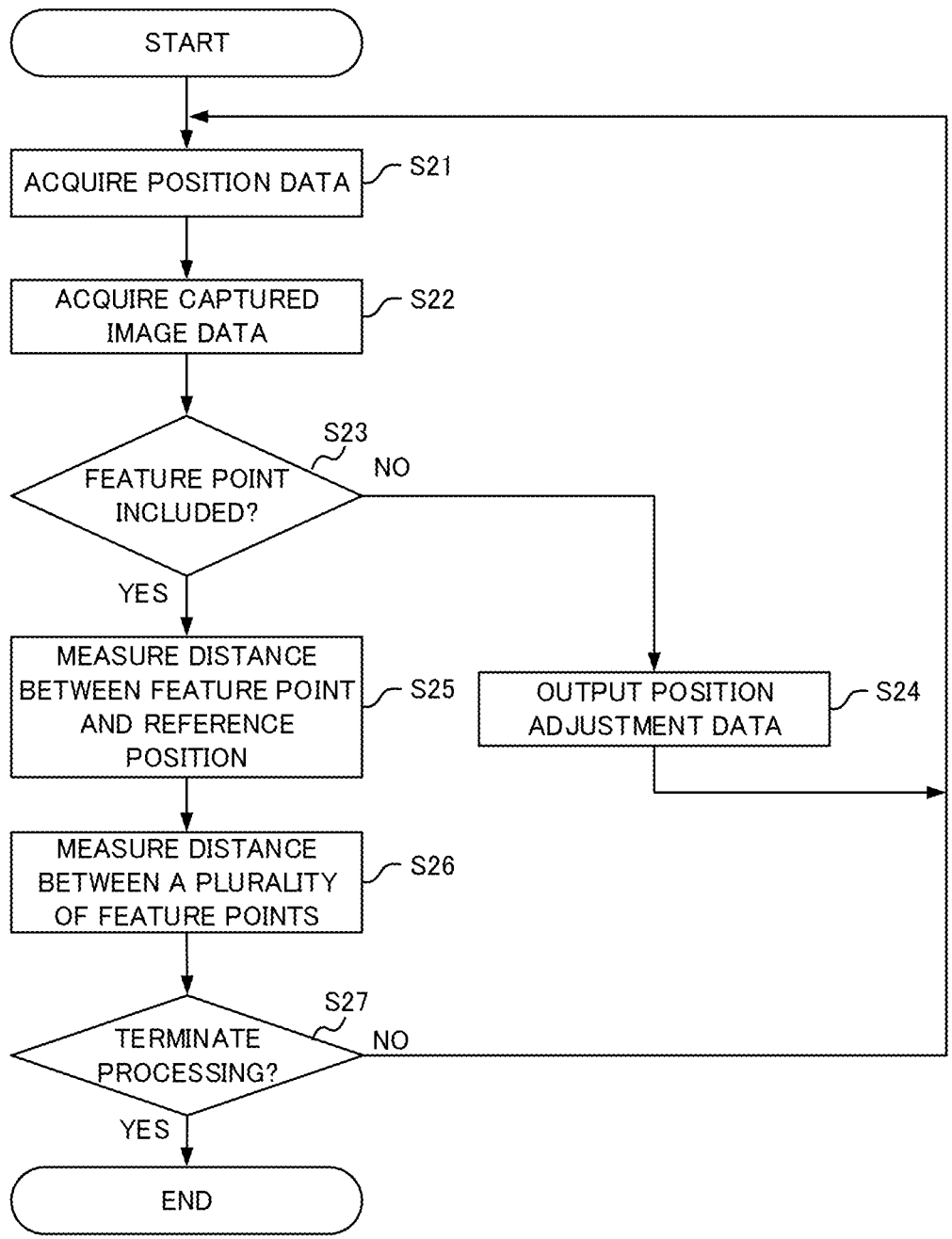
FIG. 7 is a flowchart showing an operation in the data processing apparatus 30.

FIG. 7 is a flowchart showing an operation in the data processing apparatus 30. The acquisition part 331 acquires the position data indicating the position of the imaging device 23 with respect to the reference position of the multi-axis robot 10 (step S21). The acquisition part 331 acquires the captured image data from the imaging device 23 (step S22).

The head control part 332 determines whether or not the feature point is included in the captured image data acquired by the acquisition part 331 (step S23). If the feature point is not included in the captured image data (NO in step S23), the head control part 332 outputs the position adjustment data to the multi-axis robot 10 or the measurement unit 20 (step S24). If the feature point is included in the captured image data (YES in step S23), the measurement part 333 measures the distance between the plurality of imaging devices 23 on the basis of the position of the imaging device 23 with respect to the reference position of the multi-axis robot 10.

Subsequently, the measurement part 333 measures the distance between the reference position and the feature point included in the captured image data (step S25). The measurement part 333 measures the distance between the plurality of feature points on the basis of i) the distance between the plurality of imaging devices 23 and ii) the distance between the reference position and the feature points included in the captured image data (step S26).

If an operation to terminate the processing is not performed (NO in step S27), the data processing apparatus 30 repeats the processing from S21 to S26. If an operation to terminate the processing is performed (YES in step S27), the data processing apparatus 30 terminates the processing.

[First Variation]

The above description illustrates the operation when the one or more imaging devices 23 are arranged in a straight line along the scale 221 in the measurement unit 20, but the present disclosure is not limited to thereto. The measurement unit 20 may include the plurality of imaging devices 23 arranged in a lattice pattern, for example. In this case, for example, the measurement part 333 measures the distance D between the plurality of imaging devices 23 that generated the captured image data including the feature points among the plurality of imaging devices 23. The measurement part 333 determines whether or not a feature point is included for each piece of the captured image data of the plurality of imaging devices 23, and if a feature point is determined to be included, the measurement part 333 measures the distance (for example, the distance d1 and the distance d2 shown in FIGS. 3A, 3B, and 3C) between the position of the feature point included in the captured image data and the center position of the captured image. The measurement part 333 measures the distance between the plurality of feature points included in the workpiece W on the basis of the distance D, the distance d1, and the distance d2.

Further, each of the plurality of imaging devices 23 arranged in the lattice pattern may be moved along the scale 221 provided in the horizontal direction or a direction orthogonal to the horizontal direction. By having the imaging device 23 operate in this manner, the imaging device 23 can move a shorter distance to the capturing position. As a result, the measurement unit 20 can provide a scale 221 with smaller gradations or a scale 221 with a smaller size, which allows the measurement part 333 to improve the accuracy of measuring the workpiece W.

[Second Variation]

The above description has exemplified the operation of measuring the distance of the workpiece W in the direction that the one or more imaging devices 23 can move along the scale 221, but the present disclosure is not limited thereto. For example, the measurement system 1 may specify an orientation of the workpiece W on the basis of the captured image data generated by an imaging device (not shown in figures) having a wider viewing angle than the imaging device 23, and may rotate the arm 12 such that the specified orientation coincides with the longitudinal direction of the measurement unit 20. The measurement system I measures the distance of the workpiece W on the basis of the captured image data generated by the imaging device 23, after the arm 12 is rotated. If the measurement system 1 is configured in this way, the measurement system 1 can measure the distance between the plurality of feature points of the workpiece W regardless of the orientation of the workpiece W.

[Third Variation]

Figure 8:
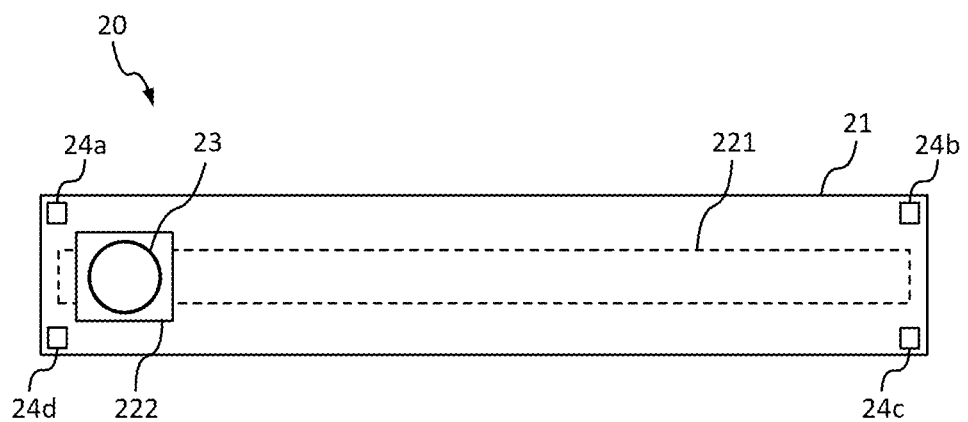
FIG. 8 shows an example of a configuration of the measurement unit 20 according to a third variation.

The above description has exemplified the operation in which the distance measurement device 24 coupled to the head part 222 measures the distance between the imaging device 23 and the feature point of the workpiece W, but the present disclosure is not limited thereto. The distance measurement device 24 may be coupled to a different position than the head part 222. FIG. 8 shows an example of a configuration of the measurement unit 20 according to a third variation. The measurement unit 20 shown in FIG. 8 differs from the measurement unit 20 shown in FIGS. 2 and 5 by having the plurality of distance measurement devices 24 (distance measurement devices 24a, 24b, 24c, and 24d) at positions near the four corners of the body 21, and the other points are the same.

The plurality of distance measurement devices 24 measure the distances from each of the plurality of feature points in the workpiece W corresponding to the plurality of distance measurement devices 24 to the distance measurement devices 24 corresponding to each of the plurality of feature points. The measurement unit 20 outputs the plurality of distances measured by the plurality of distance measurement devices 24 to the data processing apparatus 30. In the data processing apparatus 30, the measurement part 333 measures the distance from the one end to the other end of the workpiece W by correcting the distance between the position of the one end of the workpiece W and the position of the other end of the workpiece W on the basis of i) the inclination of the workpiece W with respect to the longitudinal direction of the measurement unit 20 and ii) the inclination of the workpiece W with respect to the direction orthogonal to the longitudinal direction of the measurement unit 20, with these inclinations being calculated on the basis of the plurality of distances acquired from the measurement unit 20.

The data processing apparatus 30 calculates the inclination of the workpiece W with respect to the longitudinal direction of the measurement unit 20 on the basis of i) the distances measured by the distance measurement device 24a and the distance measurement device 24b or ii) the distances measured by the distance measurement device 24c and the distance measurement device 24d, for example. The data processing apparatus 30 calculates the inclination of the workpiece W with respect to the direction orthogonal to the longitudinal direction of the measurement unit 20 on the basis of i) the distances measured by the distance measurement device 24*a* and the distance measurement device 24*d* or ii) the distances measured by the distance measurement device 24*b* and the distance measurement device 24*c*.

If the measurement unit 20 and the data processing apparatus 30 operate in this manner, the data processing apparatus 30 can measure the distance from the one end to the other end of the workpiece W by calculating the inclinations in a plurality of directions on the basis of the distances measured by the plurality of distance measurement devices 24, even if the measurement unit 20 and the workpiece W are inclined in a plurality of directions.

It should be noted that the data processing apparatus 30 may move the arm 12 such that the distances from each of the plurality of feature points in the workpiece W corresponding to the plurality of distance measurement devices 24 to the distance measurement devices 24 corresponding to each of the plurality of feature points are the same. In the data processing apparatus 30, the position to which the arm 12 is to be moved is determined on the basis of i) the inclination of the workpiece W with respect to the longitudinal direction of the measurement unit 20 and ii) the inclination of the workpiece W with respect to the direction orthogonal to the longitudinal direction of the measurement unit 20, with these inclinations being calculated by the measurement part 333, for example. Subsequently, the head control part 332 outputs the position adjustment data for moving the arm 12, to the multi-axis robot 10.

[Fourth Variation]

Figure 9:
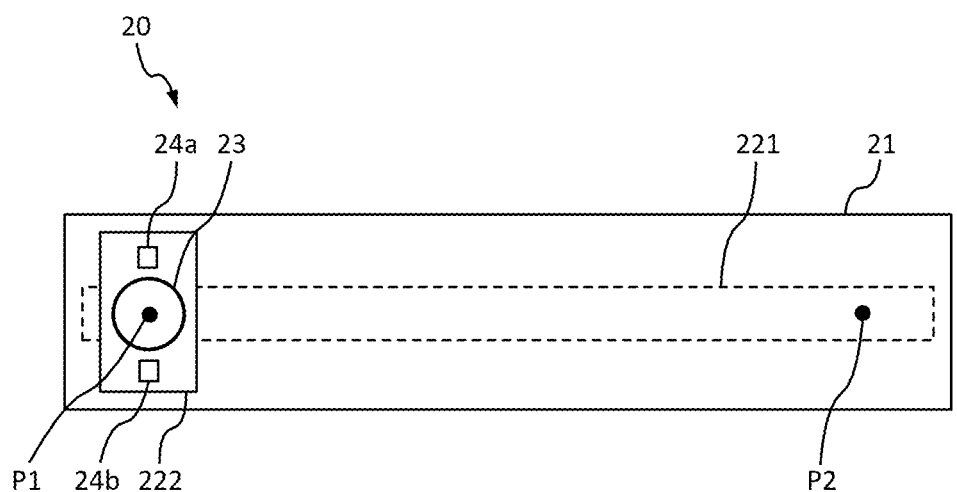
FIG. 9 shows an example of a configuration of the measurement unit 20 according to a fourth variation.

The above description has exemplified the operation in which the measurement unit 20 having the plurality of distance measurement devices 24 at positions near the four corners of the body 21 measure the distances from each of the plurality of distance measurement devices 24 to each of the plurality of feature points in the workpiece W corresponding to the plurality of distance measurement devices 24, but the present disclosure is not limited thereto. The measurement unit 20 may have the plurality of distance measurement devices 24 at a plurality of positions in the head part 222 that moves along the scale 221 indicating the position of the imaging device 23. FIG. 9 shows an example of a configuration of the measurement unit 20 according to a fourth variation. The measurement unit 20 shown in FIG. 9 is different from the measurement unit 20 shown in FIG. 8 in that the plurality of distance measurement devices (distance measurement devices 24*a* and 24*b*) are provided at a position near the upper end and a position near the lower end of the head part 222, and the other points are the same.

The plurality of distance measurement devices 24 measure, at the positions P1 and P2 shown in FIG. 9, the distances from the plurality of feature points in the workpiece W corresponding to the plurality of distance measurement devices 24 to the distance measurement devices 24 corresponding to each of the plurality of feature points, for example. In the data processing apparatus 30, the measurement part 333 calculates the inclination of the workpiece W with respect to the longitudinal direction of the measurement unit 20, on the basis of i) the distance measured by a first distance measurement device 24 (distance measurement device 24*a*) in the vicinity of the upper end of the head part 222 at the first position (position P1) and ii) the distance measured by the distance measurement device 24*a* at the second position (position P2). The measurement part 333 calculates the inclination of the workpiece W with respect to the direction orthogonal to the longitudinal direction of the measurement unit 20 on the basis of i) the distance measured by the distance measurement device 24*a* at the position P1 and ii) the distance measured by a second distance measurement device 24 (distance measurement device 24*b*) in the vicinity of the lower end of the head part 222 at the position P1. The measurement part 333 measures the distance from the one end to the other end of the workpiece W by correcting the distance between the position of the one end of the workpiece W and the position of the other end of the workpiece W, on the basis of i) the calculated inclination of the workpiece W with respect to the longitudinal direction of the measurement unit 20 and ii) the calculated inclination of the workpiece W with respect to the direction orthogonal to the longitudinal direction of the measurement unit 20.

Since the positions of the plurality of feature points in the workpiece W are different in each of the plurality of workpieces W, the positions of the feature points in the workpiece W are not always at the position corresponding to the distance measurement device 24. Regarding this point, the measurement unit 20 can align the positions of the feature points in the workpiece W with the positions corresponding to the distance measurement device 24 in the workpiece W by moving the head part 222 to the positions corresponding to each of the plurality of feature points in the workpiece W. As a result, the measurement unit 20 can measure the distances from each of the plurality of feature points and the distance measurement devices 24. The data processing apparatus 30 can measure the distance from the one end to the other end of the workpiece W by calculating the inclinations in the plurality of directions on the basis of the distances measured by the plurality of distance measurement devices 24.

[Fifth Variation]

Figure 10:
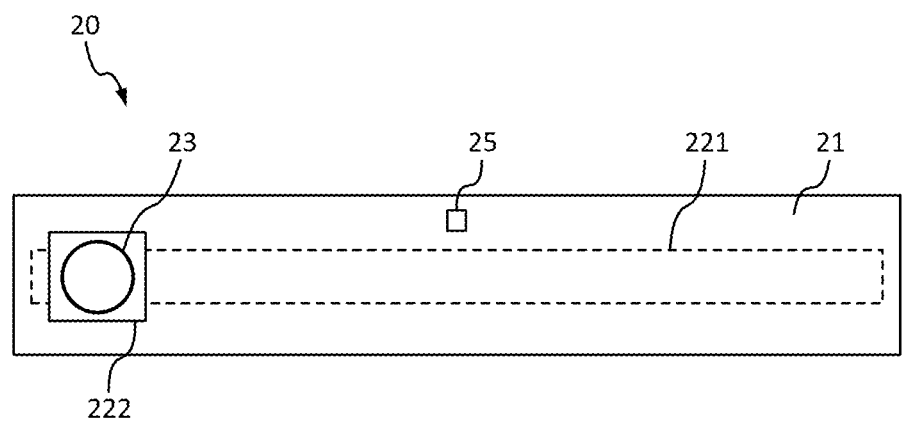
FIG. 10 shows an example of a configuration of the measurement unit 20 according to a fifth variation.

The above description has exemplified the operation in which the measurement unit 20 calculates the inclination between the measurement unit 20 and the workpiece W by measuring the distances between the distance measurement devices 24 and the feature points corresponding to the distance measurement device 24 in the workpiece W with the plurality of distance measurement devices 24, but the present disclosure is not limited thereto. The measurement unit 20 may include a sensor for measuring the inclination between the measurement unit 20 and the workpiece W. FIG. 10 shows an example of a configuration of the measurement unit 20 according to a fifth variation. The measurement unit 20 shown in FIG. 10 differs from the measurement unit 20 shown in FIGS. 8 and 9 by having a measurement device 25, and is the same in other respects.

The measurement device 25 is a Light Detection And Ranging (LiDAR) sensor, for example. The measurement device 25 measures i) the inclination between the measurement unit 20 and the workpiece W and ii) the distances from each of the plurality of feature points in the workpiece W to the positions of the measurement unit 20 corresponding to the plurality of feature points. The measurement unit 20 measures the distance from the one end to the other end of the workpiece W on the basis of the measurement result measured by the measurement device 25.

[Sixth Variation]

The above description has exemplified the operation in the case where the head driving part 223 includes the light receiving element, but the present disclosure is not limited thereto. The light receiving element may be provided inside the body 21, between the scale 221 and the arm 12*c*.

[Effect of Measurement System 1]

As described above, the measurement system 1 includes the multi-axis robot 10, the measurement unit 20 coupled to the multi-axis robot 10, and the data processing apparatus 30, and the measurement unit 20 includes the imaging device 23 movable with respect to the reference position of the multi-axis robot 10, and the position specification device 22 that specifies the position of the imaging device 23 with respect to the reference position.

Then, the data processing apparatus 30 measures the distances between the plurality of feature points in the workpiece W on the basis of the positions of the feature points of the workpiece W included in the captured image data generated by having the imaging device 23 capture an image. By having the measurement system I operate in this manner, the measurement system 1 can measure the distance between the plurality of feature points in the workpiece W with higher accuracy than the positioning accuracy of the multi-axis robot 10, thereby improving the accuracy of measuring the workpiece W using the multi-axis robot 10.

Further, in the measurement system 1, the measurement unit 20 is fixed to the tip of the arm 12 of the multi-axis robot 10 such that the measurement system 1 can align the longitudinal direction of the measurement unit 20 with the orientation of the workpiece W by rotating the arm 12. As a result, the measurement system 1 can measure the distance between the plurality of feature points included in the workpiece W regardless of the orientation of the workpiece W.

The present invention is explained on the basis of the exemplary embodiments.

The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement system comprising:
    a multi-axis robot;
    a measurement unit coupled to the multi-axis robot; and
    a data processing apparatus, wherein
    the measurement unit includes:
        one or more imaging devices movable with respect to a reference position of the multi-axis robot, and
        a position specification device for specifying a position of one or more of the imaging devices with respect to the reference position, wherein
    the data processing apparatus includes:
    a controller, including at least a processor, configured to:
        acquire a plurality of pieces of captured image data generated by having one or more of the imaging devices capture images at two or more positions, and
        measure a distance between the plurality of feature points in a workpiece on the basis of a position of the feature point of the workpiece included in the plurality of pieces of captured image data, wherein
    the measurement unit further includes a distance measurement device for measuring a distance from the imaging device to the feature point, and wherein
    the controller is further configured to measure a distance between i) a position of one end of the workpiece included in the captured image data generated by having the imaging device capture an image at a first position and ii) a position of the other end of the workpiece included in the captured image data generated by having the imaging device capture an image at a second position different from the first position, and measures a length from one end to the other end of the workpiece by correcting a distance between a position of the one end of the workpiece and a position of the other end of the workpiece, on the basis of a relationship between i) a first distance from the imaging device to the feature point measured by the distance measurement device at the first position and ii) a second distance from the imaging device to the feature point measured by the distance measurement device at the second position.

2. The measurement system according to claim 1, wherein the measurement unit includes:
    a plurality of the imaging devices, wherein
    the controller is further configured to acquire a plurality of pieces of the captured image data generated by having each of the plurality of imaging devices capture images at one or more positions.

3. The measurement system according to claim 1, wherein the position specification device includes:
    a scale including gradations showing a position of the imaging device, and
    one or more head parts moving along the scale, wherein one or more of the imaging devices move along the scale in a state coupled to one or more of the head parts.

4. The measurement system according to claim 3, wherein the measurement unit further includes:
    a head driving part, including at least a light emitting element and an actuator, for moving the head part, and
    the controller is further configured to control a position of the head part such that the feature point is at a position included in the captured image data.

5. The measurement system according to claim 4, wherein the multi-axis robot further includes:
    an arm coupled to the measurement unit, wherein
    the controller is further configured to cause the arm coupled to the measurement unit to move such that the imaging device can capture the feature point of the workpiece, by outputting position adjustment data for adjusting the position of the measurement unit to the multi-axis robot, if a distance between a position included in an area to be imaged by the imaging device and a position of a feature point of the workpiece exceeds a threshold value.

6. The measurement system according to claim 1, wherein the controller is further configured to measure a distance between a position of one end of the workpiece and a position of the other end of the workpiece on the basis of i) a distance between each of the positions of the imaging device specified at the first position and the second position by the position specification device and ii) a distance between a reference position and the feature point in each piece of the captured image data generated by having the imaging device capture images at the first position and the second position.

7. The measurement system according to claim 1, wherein the controller is further configured to measure a distance from one end to the other end of the workpiece by correcting a distance between a position of the one end of the workpiece and a position of the other end of the workpiece, on the basis of i) a difference between the first distance acquired from a first distance measurement device and the second distance acquired from a second distance measurement device and ii) an inclination of the workpiece with respect to a longitudinal direction of the measurement unit calculated on the basis of a distance between the first position and the second position.

8. The measurement system according to claim 1, wherein the measurement unit includes:
   a plurality of distance measurement devices at positions near four corners of the body of the measurement unit, wherein
   the plurality of distance measurement devices measure distances from each of a plurality of feature points in the workpiece corresponding to the plurality of distance measurement devices, and
   the controller is further configured to measure a distance from one end to the other end of the workpiece by correcting a distance between a position of the one end of the workpiece and a position of the other end of the workpiece on the basis of i) an inclination of the workpiece with respect to a longitudinal direction of the measurement unit and ii) an inclination of the workpiece with respect to a direction orthogonal to the longitudinal direction of the measurement unit, with these inclinations being calculated on the basis of a plurality of the distances acquired from the measurement unit.

9. The measurement system according to claim 1, wherein the measurement unit includes:
   a plurality of distance measurement devices at a plurality of positions in a head part moving along a scale including gradations showing a position of the imaging device, wherein
   the plurality of distance measurement devices measure distances from each of a plurality of feature points in the workpiece corresponding to the plurality of distance measurement devices, and
   the controller is further configured to:
      i) calculate an inclination of the workpiece with respect to the longitudinal direction of the measurement unit on the basis of a) the distance measured by a first distance measurement device in the vicinity of an upper end of the head part at a first position and b) the distance measured by the first distance measurement device at a second position,
      ii) calculate the inclination of the workpiece with respect to a direction orthogonal to the longitudinal direction of the measurement unit on the basis of a) the distance measured by the first distance measurement device at the first position and b) the distance measured by a second distance measurement device in the vicinity of the lower end of the head part at the first position, and
      iii) correct the distance between the position of one end of the workpiece and the position of the other end of the workpiece on the basis of a) the inclination of the workpiece relative to the longitudinal direction of the measurement unit and b) the inclination of the workpiece relative to a direction orthogonal to the longitudinal direction of the measurement unit, to measure the distance from one end of the workpiece to the other end of the workpiece.

10. A measurement method, executed by a computer, comprising:
    acquiring a plurality of pieces of captured image data generated by having one or more imaging devices, supported by a multi-axis robot, capture images at two or more positions; and
    measuring a distance between a plurality of feature points in a workpiece on the basis of a position of a feature point of the workpiece included in the plurality of pieces of captured image data, wherein
    during the measuring the distance, measuring a distance between i) a position of one end of the workpiece included in the captured image data generated by having the imaging device capture an image at a first position and ii) a position of the other end of the workpiece included in the captured image data generated by having the imaging device capture an image at a second position different from the first position, and measuring a length from one end to the other end of the workpiece by correcting a distance between a position of the one end of the workpiece and a position of the other end of the workpiece, on the basis of a relationship between i) a first distance from the imaging device to the feature point measured by a distance measurement device for measuring a distance from the imaging device to the feature point at the first position and ii) a second distance from the imaging device to the feature point measured by the distance measurement device at the second position.

11. A non-transitory storage medium storing a program for causing a computer to execute:
    acquiring a plurality of pieces of captured image data generated by having one or more imaging devices, supported by a multi-axis robot, capture images at two or more positions; and
    measuring a distance between a plurality of feature points in a workpiece on the basis of a position of a feature point of the workpiece included in the plurality of pieces of captured image data, wherein
    during the measuring the distance, measuring a distance between i) a position of one end of the workpiece included in the captured image data generated by having the imaging device capture an image at a first position and ii) a position of the other end of the workpiece included in the captured image data generated by having the imaging device capture an image at a second position different from the first position, and measuring a length from one end to the other end of the workpiece by correcting a distance between a position of the one end of the workpiece and a position of the other end of the workpiece, on the basis of a relationship between i) a first distance from the imaging device to the feature point measured by a distance measurement device for measuring a distance from the imaging device to the feature point at the first position and ii) a second distance from the imaging device to the feature point measured by the distance measurement device at the second position.

* * * * *